United States Patent [19]

Franzen et al.

[11] 4,396,799

[45] Aug. 2, 1983

[54] COMBINATION OF A LOUDSPEAKING TELEPHONE SET AND A HAND SET FOR SOFT SPEAKING

[75] Inventors: Klaas R. Franzen; Gijsbert W. Versteeg, both of Hilversum; Cornelis M. A. Theunisse, Dordrecht, all of Netherlands

[73] Assignee: U.S. Philips Corporation, New York, N.Y.

[21] Appl. No.: 183,865

[22] Filed: Sep. 4, 1980

[30] Foreign Application Priority Data

Sep. 19, 1979 [NL] Netherlands ............... 7906957

[51] Int. Cl.$^3$ ........................................... H04M 1/60
[52] U.S. Cl. ................................. 179/1 FS; 179/81 B
[58] Field of Search .................. 179/1 F, 1 FS, 1 P, 179/1 HF, 1 VC, 1 C, 2 C, 81 R, 81 A, 81 B, 159 R

[56] References Cited

U.S. PATENT DOCUMENTS 3,928,723 12/1975 Kai .................................. 179/1 FS

FOREIGN PATENT DOCUMENTS 2633394 1/1978 Fed. Rep. of Germany .

OTHER PUBLICATIONS

J. P. Dahl et al., "RF Hook Switch", IBM *Technical Disclosure Bulletin*, vol. 24, No. 4, Sep. 1981, pp. 1891–1892.

*Primary Examiner*—Joseph A. Popek
*Attorney, Agent, or Firm*—Thomas A. Briody; William J. Streeter; Laurence A. Wright

[57] ABSTRACT

Loudspeaking telephone set having a hand set connected thereto for soft speaking. When the hand set is placed on the telephone set, the microphone and the loudspeaker being in the switched-on condition, there is a risk that oscillations or singing will occur due to acoustic feedback. In order to avoid this risk, the hand set is provided with an ultrasonic transmitting device and the telephone set is provided with an ultrasonic receiving device 13. The receiving device comprises means to determine the propagation time of the ultrasonic signals and means for affecting the gain of the loudspeaking channel of the telephone set in dependence on the propagation time.

6 Claims, 5 Drawing Figures

COMBINATION OF A LOUDSPEAKING TELEPHONE SET AND A HAND SET FOR SOFT SPEAKING

The invention relates to a combination of a loudspeaking telephone set and a hand set, having a microphone and a telephone, connected thereto to provide a soft-speaking facility, the loudspeaking telephone set including a loudspeaking channel and a loudspeaker connected thereto.

BACKGROUND OF THE INVENTION

Such a telephone set is disclosed in, for example, Telesis Fall 1975, pp. 84–90.

When a telephone set comprises a monitoring amplifier, the loudspeaker being incorporated in the base of the set, oscillations may occur, so-called singing, due to acoustic feedback when the hand set is close to the base of the telephone set and the monitoring amplifier is on. The acoustic coupling between the microphone and the loudspeaker could be compensated for by an attenuation network included in the loudspeaking channel and having a transfer characteristic which is the inverse of the acoustic transfer characteristic between the microphone and the loudspeaker. However, such a network will also affect normal speech transmission in the situations where there is no risk of oscillations due to acoustic feedback.

OBJECT OF THE INVENTION

It is the object of the invention to avoid oscillations or singing when the handset is close to loudspeaking telephone set without affecting the normal speech transmission when the handset and the loudspeaking telephone set are separated by a sufficient distance that the risk of singing due to acoustic feedback is small.

SUMMARY OF THE INVENTION

According to the invention the combination is characterized in that the combination comprises an ultrasonic transmitting device for transmitting ultrasonic pulses in free space and that it comprises an ultrasonic receiving device for receiving ultrasonic pulses from free space, the ultrasonic transmitting device comprising an ultrasonic transducer and the ultrasonic receiving device comprising an ultrasonic transducer, one of the transducers being included in the hand set and the other transducer in the loudspeaking telephone set, and that means have been provided in the receiving device for the determination of the propagation time of the ultrasonic pulses between the handset and the loudspeaking telephone set and means for affecting in dependence on the propagation time the gain of the loudspeaking channel.

BRIEF DESCRIPTION OF THE DRAWING

The invention will be further explained with reference to accompanying drawings wherein.

DETAILED DESCRIPTION OF THE PREFERRED EMBODIMENT

Figure 1:
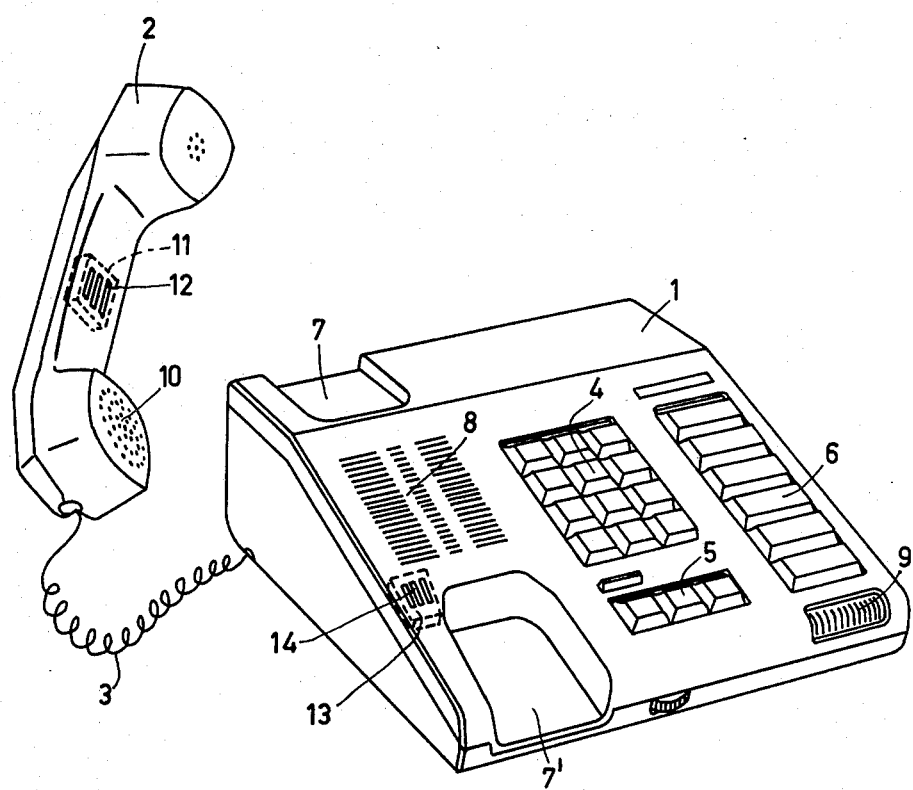
FIG. 1 is an perspective view of a loudspeaking telephone set having a handset connected thereto.

Referring to FIG. 1, the loudspeaking telephone set 1 has a hand set 2, connected thereto by means of a cord 3.

The loudspeaking telephone set 1 comprises inter alia a keyboard 4 and sets of functional keys 5 and 6. A pair of recesses 7 and 7' accommodate hand set 2. The case of the telephone set is provided with apertures 8 behind which the loudspeaker is positioned.

A microphone may be positioned behind the apertures denoted by 9, to provide a hands free speech facility.

When the hand set is placed in recesses 7—7' or the microphone apertures 10 are placed close to loudspeaker apertures 8 and the loudspeaker and the hand set are switched on, there is a risk that oscillations or singing will occur owing to the acoustic coupling between the microphone and the loudspeaker.

In order to reduce the effects of acoustic feedback the hand set includes an ultrasonic transmitting device 11, which is in connection with free space through the apertures 12 in the case of the hand set. The telephone set 1 also includes an ultrasonic receiving device 13, which is in connection with free space through the apertures 14.

Figure 2:
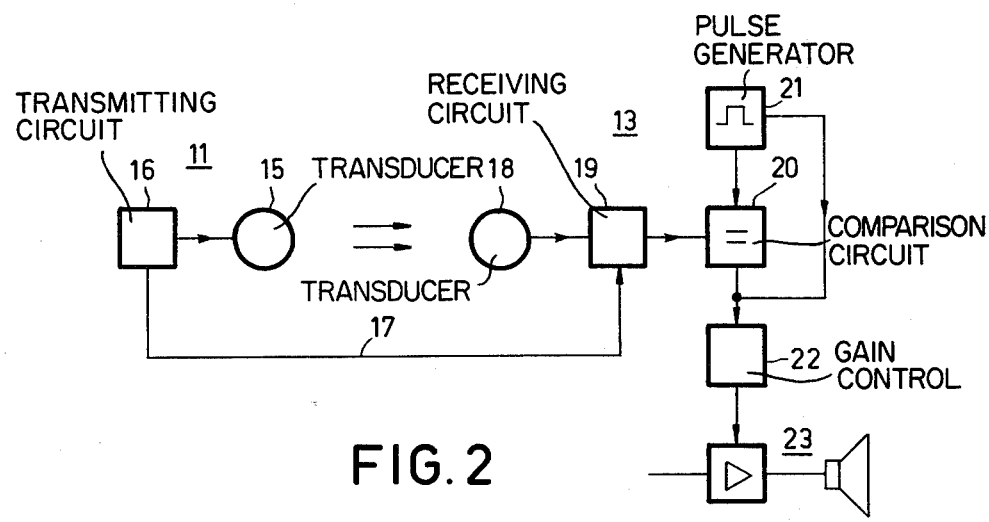
FIG. 2 is a block schematic diagram of a gain control arrangement for the amplifier in the loudspeaking channel of the set shown in FIG. 1, the gain control arrangement comprising ultrasonic transmitting and receiving devices.

Ultrasonic transmitting device 11 (FIG. 2) comprises ultrasonic transducer 15 which is energized by an electronic transmitting circuit 16. The latter also generates a trigger signal, which is applied to ultrasonic receiving device 13 through line 17.

Ultrasonic receiving device 13 comprises an ultrasonic transducer 18, connected to receiving circuit 19. The latter produces pulse signals whose pulse duration is dependent on the propagation time of the ultrasonic sound waves propagating from transducer 15 to transducer 18.

The pulse duration of the output signals of receiving circuit 19 is compared in comparison circuit 20 with the pulse duration of a reference pulse generated by pulse generator 21.

When the pulse duration of the output signal of receiving circuit 19 exceeds the output pulse duration of pulse generator 21, it is indicative of a situation in which the handset is at a distance which is greater than a given minimum distance from the telephone set. The pulse duration of pulse generator 21 has been adjusted so that, in this situation, the level of acoustic feedback is such that singing or acoustic feedback is unlikely to occur.

When the pulse duration of the output signal of receiving circuit 19 is shorter than the pulse duration of pulse generator 21, it is indicative of a situation in which oscillations or singing may occur. Comparison circuit 20 then produces an output signal to which gain control means 22 is responsive by controlling the gain of loudspeaking channel 23. This control may be in the form of a continuous control in which the gain decreases continuously with the distance between the hand set and the telephone set. In practice it has been found that singing does not occur unless the hand set is within a small distance, in the order of 10 to 15 cms, of the loudspeaking telephone set and a simple on-off control is sufficient.

In order to prevent the loudspeaking channel from being switched on/off each time by variations around a given distance, the boundary between switch-on and switch-off is shifted in such a way that after the loudspeaker channel has been switched off the loudspeaker channel is not switched on until the distance has increased by a certain amount. After the loudspeaker channel has been switched on the channel is not switched off until the distance has decreased by a given amount. Such a control with hysteresis will be further described hereinafter.

Figure 3:
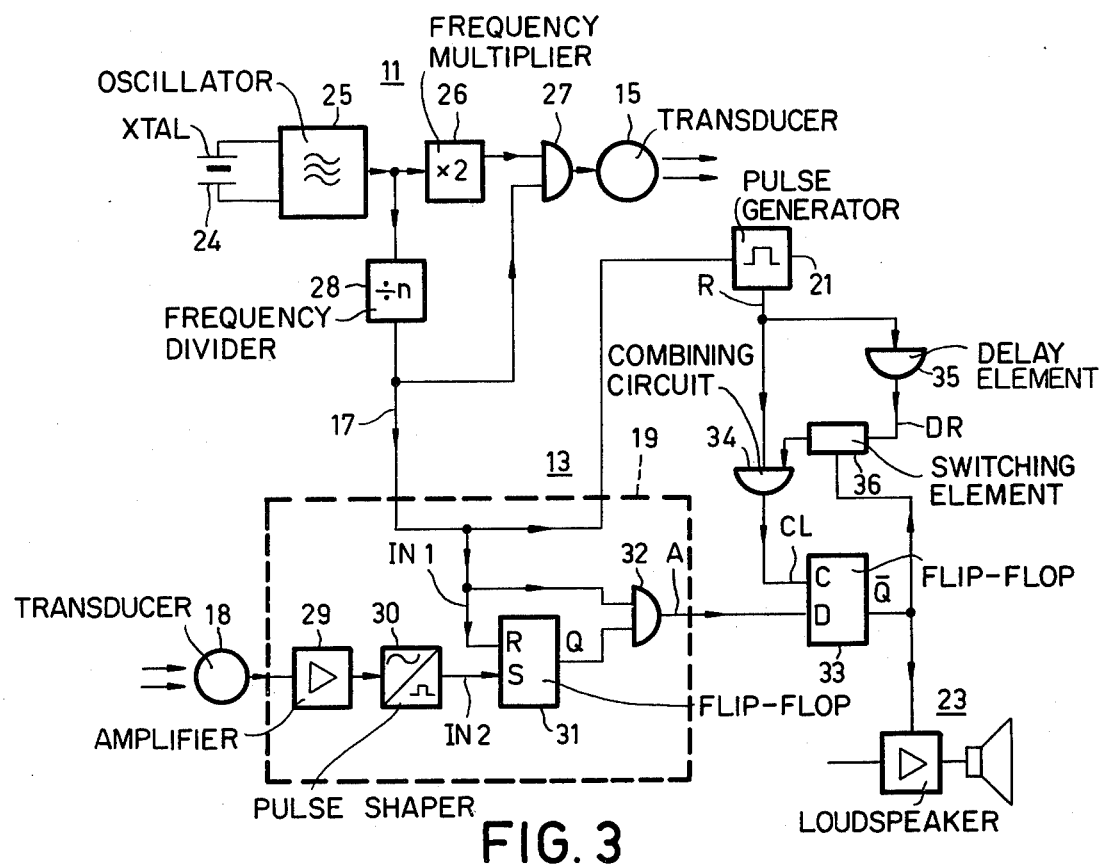
FIG. 3 is a more detailed circuit diagram of one embodiment of the arrangement shown in FIG. 2.

The ultrasonic transmitting device as shown in FIG. 3 comprises an oscillator 25, the frequency of which is controlled by a crystal 24. The output signal of the oscillator is applied to the ultrasonic transducer 15 by means of an AND-gate 27 after its frequency has been doubled in frequency doubling stage 26. The output signal from oscillator 25 is also applied to the frequency divider 28, which produces an output signal whose level is alternately high, for example during n periods of stage 26 and is low thereafter for n periods. This output signal from frequency divider 28 controls AND-gate 27 such that transducer 15 transmits pulses for a period equal to n periods of the output of stage 26, the pulses being separated by the same interval of n periods. The output signal of frequency divider 28 simultaneously functions as the trigger signal for receiving circuit 19 and for pulse generator 21, it is applied to both through line 17.

Figure 4:
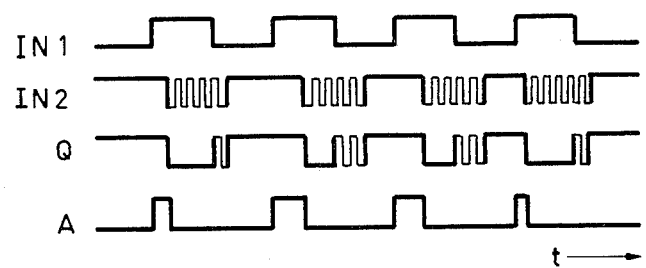
FIGS. 4 and 5 are timing diagrams to explain the operation of the arrangement shown in FIG. 3.

The output signal of transducer 18 of receiving device 13 is amplified by an amplifier 29 and is thereafter converted into pulses by pulse shaper 30. These pulses are applied to the set input of SR-flip-flop 31 (signal IN 2 FIG. 4). The trigger signal on line 17 is applied to the reset input (signal IN 1) of SR-flip-flop 31. The trigger signal is combined with the signal of the Q-output by means of AND-gate 32 (output signal A). The signals IN 1, IN 2, Q and A are illustrated in FIG. 4. Signal A consists of pulses whose width depends on the distance between transducers 15 and 18.

Signal A is applied to the D-input of a D-type-flip-flop 33. A clock signal formed by the reference pulses of pulse generator 21, combined or not combined with a delayed version of the reference pulses, is applied to clock input C. The pulses produced by pulse generator 21 (signal R, FIG. 5) are applied to combining circuit 34 and to the delay element 35 (signal DR). The signal DR is passed or not passed by switching element 36 to combining circuit 34, where it is combined with the undelayed signal R. Combining signals R and DR produces the clock signal for D-type-flip-flop 33 (signal CL.).

Figure 5:
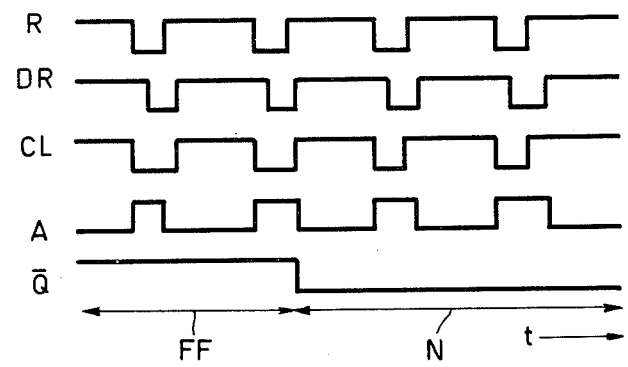

Switching element 36 is controlled by the output signal from the Q-output-flip-flop 33 in the manner illustrated in FIG. 5 which illustrates the case where the loudspeaker channel was initially switched off and the hand set is removed from the telephone set. In the period FF the loudspeaking channel is switched off under the control of the Q-output and the loudspeaking channel is switched on in the period N. In this latter period N, switching element 36 is blocked under the control of the Q-output, causing the clock pulses of the signal CL to have a shorter duration than in period FF. The distance between the hand set and the telephone set must then first decrease by a given amount, corresponding to the decrease in the duration of the clock pulses, before the loudspeaking channel is switched off again. Because of hysteresis in the control of the loudspeaking channel, rapid changes between switch-on and switch-off around a given distance is prevented.

In the practical implementation of the invention several variations are still possible. It is alternatively possible to interchange the position of transmitting device 11 and receiving device 13 shown in FIG. 1. The ultrasonic pulses are then transmitted from telephone set 1 and received in hand set 2.

In the practical implementation it is sufficient to incorporate only the ultrasonic transducer 15 or 18 in the hand set. The electronic circuits of the receiving and of the transmitting devices may then be completely incorporated in the telephone set. A provision need then only be arranged between the hand set and the telephone set to transmit the electric signal of the ultrasonic transducer.

Several variations of the position of the ultrasonic transducers in the telephone set and the hand set are possible. An advantageous position is the position in which the ultrasonic transducer 15 of transmitting device is disposed on the cone of the loudspeaker of the telephone set and the ultrasonic transducer 18 of the receiving device is arranged behind the microphone apertures in the hand set.

What is claimed is:

1. A combination of a loudspeaking telephone set and a handset having a microphone and a receiver connected thereto, the loudspeaking telephone set including a loudspeaking channel and a loudspeaker connected thereto,
    said combination telephone set further comprising an ultrasonic transmitting device for transmitting ultrasonic pulses in free space, an ultrasonic receiving device for receiving ultrasonic pulses from free space, said ultrasonic transmitting device comprising an ultrasonic transducer and said ultrasonic receiving device comprising an ultrasonic transducer, one of said transducers being incorporated in the handset and the other transducer in the loudspeaking telephone set, means in said receiving device for determining the propagation time of the ultrasonic pulses between said handset and said loudspeaking telephone set, and means for controlling the gain of the loudspeaking channel based upon said propagation time.

2. A combination as claimed in claim 1, wherein said means for controlling the gain of the loudspeaking channel is arranged to switch said loudspeaker channel off, when the propagation time is below a predetermined value.

3. A combination as claimed in claim 2, wherein said means for controlling the loudspeaking channel gain is arranged to switch said loudspeaker channel on when the propagation time of the ultrasonic pulses exceeds the propagation time at which the loudspeaker channel is switched off.

4. A combination as claimed in claim 1, comprising an electrical connection between said ultrasonic transmitting device and said ultrasonic receiving device for transmitting a trigger signal from said ultrasonic transmitting device to determine the start time for the measurement of the propagation time of the ultrasonic pulses.

5. The combination as claimed in claim 4, wherein said ultrasonic transmitting device comprises a frequency divider for generating said trigger signal having a period which includes an integral number of periods of the transmitted ultrasonic pulses.

6. A combination as claimed in claim 5, comprising an ultrasonic oscillator, and wherein said frequency divider generates a signal to pulse modulate the electrical signal produced by said ultrasonic oscillator, before it is applied to said transmitting ultrasonic transducer.

* * * * *